US006424906B1

(12) United States Patent
Zhu et al.

(10) Patent No.: US 6,424,906 B1
(45) Date of Patent: Jul. 23, 2002

(54) CLOSED-LOOP ACTUATOR CONTROL SYSTEM HAVING BUMPLESS GAIN AND ANTI-WINDUP LOGIC

(75) Inventors: G. George Zhu, Novi, MI (US); Mark W. Pyclik, Bloomington, IN (US); Eric K. Bradley; Larry J. Brackney, both of Columbus, IN (US)

(73) Assignee: Cummins, Inc., Columbus, IN (US)

( * ) Notice: Subject to any disclaimer, the term of this patent is extended or adjusted under 35 U.S.C. 154(b) by 0 days.

(21) Appl. No.: 09/774,425

(22) Filed: Jan. 31, 2001

(51) Int. Cl.[7] ........................ F02D 43/04; F02D 45/00; G06F 19/00

(52) U.S. Cl. ........................................ 701/115; 700/34

(58) Field of Search ................................ 701/101, 102, 701/115; 700/33–35; 318/609, 610

(56) References Cited

U.S. PATENT DOCUMENTS

| | | | | |
|---|---|---|---|---|
| 4,571,945 A | | 2/1986 | Inada et al. | |
| 4,794,759 A | | 1/1989 | Lyon | |
| 4,817,387 A | | 4/1989 | Lashbrook | |
| 4,961,319 A | | 10/1990 | Lyon | |
| 5,190,020 A | * | 3/1993 | Cho | 123/684 |
| 5,268,842 A | | 12/1993 | Marston et al. | |
| 5,429,089 A | * | 7/1995 | Thornberg et al. | 123/352 |
| 5,445,128 A | | 8/1995 | Letang et al. | |
| 5,477,827 A | | 12/1995 | Weisman, II et al. | |
| 5,483,927 A | | 1/1996 | Letang et al. | |
| 5,553,575 A | | 9/1996 | Beck et al. | |
| 5,647,317 A | | 7/1997 | Weisman, II et al. | |
| 5,732,676 A | | 3/1998 | Weisman et al. | |
| 5,847,644 A | | 12/1998 | Weisman, II et al. | |
| 6,349,700 B1 | * | 2/2002 | Buckland et al. | 123/352 |

* cited by examiner

*Primary Examiner*—Andrew M. Dolinar
(74) *Attorney, Agent, or Firm*—Barnes & Thornburg

(57) ABSTRACT

A closed-loop actuator control system includes a single PI controller for controlling one or more actuators to minimize an error between an engine operating parameter value and a reference parameter value. In multiple actuator systems, the control system of the present invention is operable to drive one actuator to its upper limit before transferring control to the next actuator. The proportional gain block of the PI controller preferably includes a bumpless gain feature operable to limit the rate of change of the proportional gain to thereby provide smooth gain scheduling. A feedforward block may optionally be included that preferably includes the bumpless gain feature. The actuator control system further includes anti-windup logic operable to disable the PI integrator if the actuator drive signal is upper or lower limit bounded and the error signal is greater or less than zero respectively, thereby creating dynamic saturation of the PI integrator.

27 Claims, 5 Drawing Sheets

CLOSED-LOOP ACTUATOR CONTROL SYSTEM HAVING BUMPLESS GAIN AND ANTI-WINDUP LOGIC

FIELD OF THE INVENTION

The present invention relates generally to actuator control systems, and more specifically to systems for controlling one or more actuators in an effort to control a single operating condition in an internal combustion engine environment.

BACKGROUND OF THE INVENTION

Actuator control systems are well-known and widely used in the automotive and diesel engine industries to control fuel systems, various valved mechanisms, engine and wheel brake systems, and the like. Many such actuator control systems utilize proportional-integral (PI) or proportional-integral-derivative (PID) controllers to achieve predictable and reliable actuator behavior.

While many different actuator control systems have been successfully implemented in a number of motor vehicle applications, some specific applications of known actuator control systems have a number of drawbacks associated therewith. For example, in known multiple-actuator control applications, open-loop control techniques have been used heretofore to control actuator behavior based on current engine operating conditions. However, such open-loop strategies typically require costly calibration and re-calibration of the engine controller. Moreover, such open-loop control strategies are necessarily overly conservative since they must take into account engine-to-engine variability, engine aging and variances in engine operation due to changes in altitude and other operational conditions.

As another example, single and multiple actuator control systems alike may have one or more dynamic gains associated therewith. Unfortunately, rapid changes in any of these dynamic gain values typically result in noticeable step-changes, or so-called "bumps", in actuator behavior. As yet another example, it is often desirable to limit the one or more actuator drive signals between upper and/or lower boundary values therefore. However, in known PI and PID controllers, the integral portion of the controller continues to integrate the input signal even though one or more of the actuator drive signals may be upper or lower bound saturated.

What is therefore needed is an accurate, closed-loop actuator control system applicable to single or multiple actuator systems that overcomes one or more of the foregoing drawbacks of prior art actuator control systems.

SUMMARY OF THE INVENTION

The foregoing shortcomings of the prior art are addressed by the present invention. In accordance with one aspect of the present invention, a closed-loop actuator control circuit comprises a first arithmetic circuit producing an error signal as a difference between an engine operating parameter signal and a reference parameter value, a controller responsive to said error signal to produce an actuator control signal, a first limiter responsive to said actuator control signal to produce a first actuator drive signal for driving a first actuator associated with a first engine control mechanism to minimize said error signal, and a second limiter responsive to a difference between said first actuator control signal and said first actuator drive signal to produce a second actuator drive signal, said second actuator drive signal driving a second actuator associated with a second engine control mechanism separate from said first engine control mechanism to minimize said error signal when said first actuator drive signal is limited by said first limiter to a maximum first actuator drive signal limit.

In accordance with another aspect of the present invention, a closed-loop actuator control circuit comprises a rate limiter limiting a proportional gain value to a rate-limited gain value based on a maximum gain change rate value, a first arithmetic circuit producing a proportional signal as a product of an engine operating parameter error signal and said rate-limited gain value, a controller circuit producing an actuator control signal based at least in part on said proportional signal, and a limiter circuit limiting said actuator control signal to between upper and lower limit values and producing an actuator drive signal corresponding thereto for driving an actuator associated with an engine control mechanism to minimize said error signal.

In accordance with a further aspect of the present invention, a closed-loop actuator control circuit comprises an integral circuit integrating an engine operating parameter error signal to produce an integral signal, a first arithmetic circuit producing an actuator control signal based at least in part on said integral signal, a limiter circuit limiting said actuator control signal to between upper and lower limit values and producing an actuator drive signal corresponding thereto for driving an actuator associated with an engine control mechanism to minimize said error signal, and an anti-windup circuit having a first input receiving said upper limit value, a second input receiving said actuator control signal delayed in time and a third input receiving said error signal, said anti-windup circuit disabling integration of said error signal by said integral circuit if said actuator control signal delayed in time is greater than said upper limit value and said error signal is greater than a predefined error value.

One object of the present invention is to provide a closed-loop actuator control circuit operable to control multiple actuators with a single PI controller in order to minimize an error between an engine operating parameter and a reference parameter.

Another object of the present invention is to provide a PI actuator control circuit having a proportional gain circuit configured to limit the rate of change of the proportional gain term to thereby ensure satisfactory signal tracking performance for sudden variations in the proportional gain term and provide for smooth (i.e., "bumpless") gain scheduling.

Yet another object of the present invention is to provide a PI actuator control circuit having an anti-windup circuit configured to provide for dynamic saturation of the PI integrator by disabling positive integration if the actuator drive signal output is upper-limited bounded and disabling negative integration if the actuator drive signal is lower-limit bounded.

These and other objects of the present invention will become more apparent from the following description of the preferred embodiment.

DESCRIPTION OF THE PREFERRED EMBODIMENT

Figure 1:
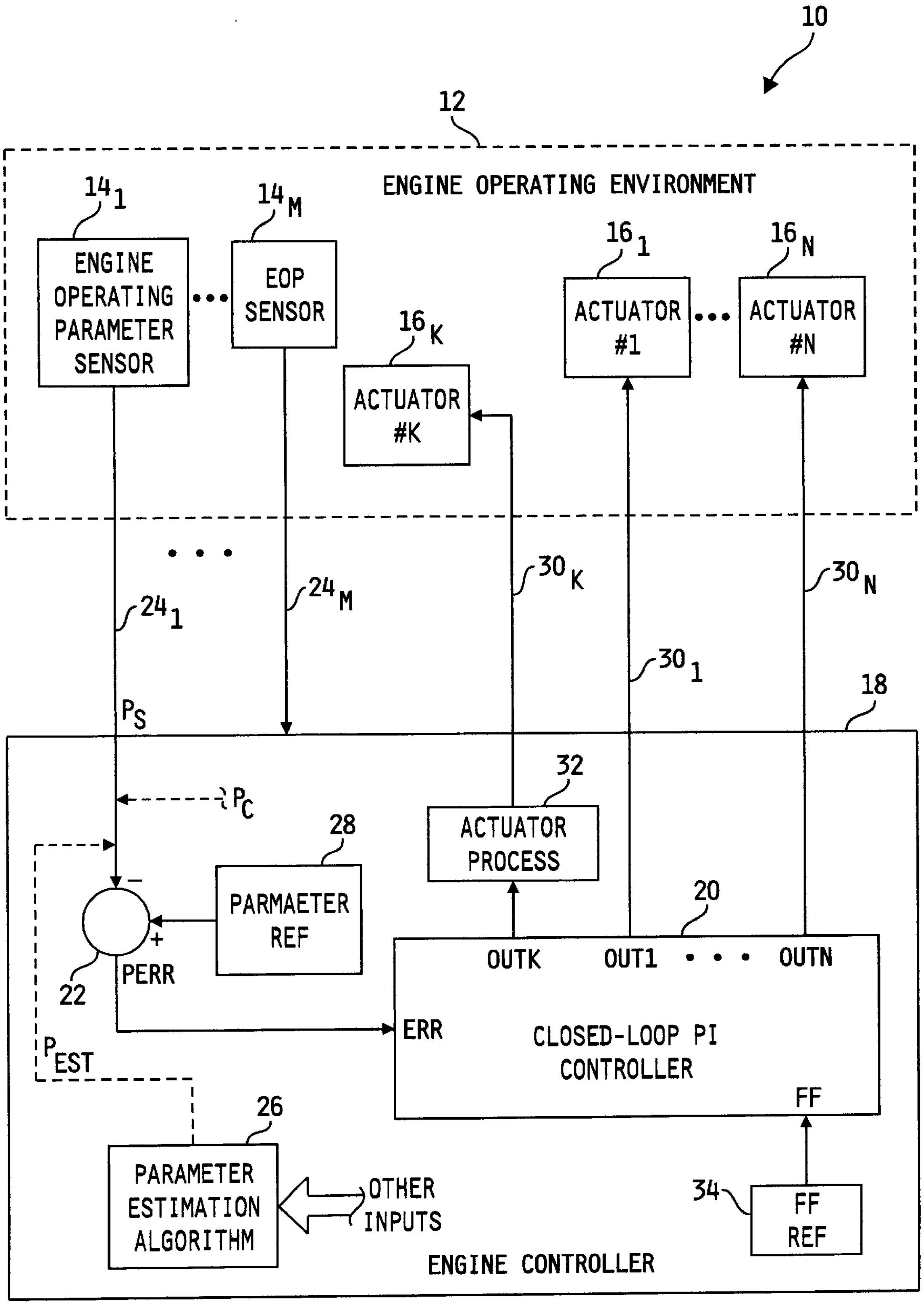
FIG. 1 is a diagrammatic illustration of one preferred embodiment of an actuator control system for an internal combustion engine including a closed-loop PI controller, in accordance with the present invention.

For the purposes of promoting an understanding of the principles of the invention, reference will now be made to one preferred embodiment illustrated in the drawings and specific language will be used to describe the same. It will nevertheless be understood that no limitation of the scope of the invention is thereby intended, such alterations and further modifications in the illustrated embodiment, and such further applications of the principles of the invention as illustrated therein being contemplated as would normally occur to one skilled in the art to which the invention relates.

Referring now to FIG. 1, one preferred embodiment of an actuator control system 10 for an internal combustion engine, in accordance with the present invention, is shown. System 10 includes an engine operating environment 12 including an internal combustion engine and related engine components. Engine operating environment 12 may include a number, M, of engine operating parameter sensors $\mathbf{14}_1$–$\mathbf{14}_M$, wherein M may be any positive integer. In general, any of the engine operating parameter sensors $\mathbf{14}_1$–$\mathbf{14}_M$ may be any known sensor operable to sense an engine operating condition and produce an electrical signal corresponding thereto. Examples of the engine operating parameter sensors $\mathbf{14}_1$–$\mathbf{14}_M$ may include, but are not limited to, an engine speed sensor, a vehicle speed sensor, a turbocharger speed sensor, an intake manifold temperature sensor, an intake manifold pressure sensor, an EGR differential pressure sensor, an EGR valve position sensor, an engine coolant temperature sensor, and the like.

The engine operating environment 12 further includes a number, N, of engine control mechanism actuators $\mathbf{16}_{1-16N}$, wherein N may be any positive integer. In accordance with the present invention, any of the actuators $\mathbf{16}_{1-16N}$ may be associated with any known engine control mechanism operable to control one or more engine operating conditions. Examples of engine control mechanisms associated with any one or more of the actuator $\mathbf{16}_{1-16N}$ may include, but are not limited to, a turbocharger wastegate, a variable geometry turbocharger (VGT) control mechanism, an engine exhaust throttle, an EGR valve, an engine compression brake, an engine fueling system, and the like.

Central to system 12 is an engine controller 18 that is preferably microprocessor-based and is generally operable to control and manage the overall operation of the engine operating environment 12. Engine controller 18 includes a memory unit (not shown) as well as a number of inputs and outputs for interfacing with the various sensors $\mathbf{14}_1$–$\mathbf{14}_M$ and actuators $\mathbf{16}_1$–$\mathbf{16}_N$. Controller 18, in one embodiment, may be a known control unit sometimes referred to as an electronic or engine control module (ECM), electronic or engine control unit (ECU) or the like, or may alternatively be a general control circuit capable of operation as described hereinafter.

In accordance with the present invention, engine controller 18 includes a closed-loop PI controller 20 having an error input ERR receiving a parameter error value PERR from an output of a summing node 22. An addition input of summing node 22 receives a parameter reference value stored within block 28, and a subtraction input of summing node 22 receives an engine operating parameter signal which, in accordance with the present invention, may be supplied by any of a number of sources. In one embodiment, for example, the inverting input of summing node 22 is electrically connected to engine operating parameter sensor $\mathbf{14}_1$, via signal path $\mathbf{24}_1$, and the engine operating parameter signal supplied to the inverting input of summing node 22 corresponds to the sensor parameter value $P_s$ produced by sensor $\mathbf{14}_1$. As an example of this embodiment, the engine operating parameter sensor $\mathbf{14}_1$, may be a turbocharger speed sensor, in which case the parameter reference value stored within block 28 is a target or desired turbocharger speed value. The parameter error value PERR produced at the output of summing node 22 thus corresponds to a turbocharger speed error value based on a difference between the two input signals.

In an alternate embodiment, the engine operating parameter signal supplied to the inverting input of summing node 22 corresponds to a composite parameter value $P_c$ formed as a combination of any number of engine operating parameter sensor signals. In this embodiment, the engine operating environment includes a number of operating parameter sensors $\mathbf{14}_1$–$\mathbf{14}_M$, each electrically connected to engine controller 18 via corresponding signal paths $\mathbf{24}_1$–$\mathbf{24}_M$. In this embodiment, engine controller 18 is operable to combine at least two of the engine operating parameter sensor signals on signal paths $\mathbf{24}_1$–$\mathbf{24}_M$ to form a composite parameter signal $P_c$ in accordance with techniques well known in the art. For example, the desired composite engine operating parameter signal may be engine exhaust pressure, and two of the engine operating parameter sensors $\mathbf{14}_1$–$\mathbf{14}_M$ may be an intake manifold pressure sensor and an EGR differential pressure sensor. In this case, engine controller 18 is operable to simply add the intake manifold pressure sensor signal to the EGR differential pressure sensor signal to provide the composite exhaust pressure signal as is known in the art, and to supply the composite exhaust pressure signal to the subtraction input of summing node 22. The parameter reference value stored in block 28 corresponds to a composite parameter reference value; in this case a target or desired engine exhaust pressure value, and the parameter error value PERR produced by summing block 22 is an error signal corresponding to a difference between the two composite input signal values.

In another alternative embodiment, the engine operating parameter signal supplied to the subtraction input of summing node 22 corresponds to an estimated parameter value $P_{EST}$ produced by a parameter estimation algorithm 26 executed by engine controller 18. In this embodiment, the parameter estimation algorithm 26 may receive one or more engine operating parameter sensor signals from any of sensors $14_1$–$14_M$, as well as other inputs internally generated by engine controller 18, and compute an estimated engine operating parameter $P_{EST}$ as a function thereof. For example, the other inputs provided to the parameter estimation algorithm 26 may include one or more signals or values produced by engine controller 18 pursuant to one or more other control strategies executed thereby, and/or estimated parameter values produced by other parameter estimation algorithms executed by engine controller 18. In any case, the parameter reference value stored in block 28 is, in this embodiment, a target or desired value of the estimated parameter value PEST, and the parameter error value PERR produced by summation node 22 is the difference between the two input signals. As an example of this embodiment, the parameter estimation algorithm 26 may be configured to estimate a charge flow value corresponding to a mass flow value of charge entering an intake manifold of the engine. In this case, the parameter reference value stored in block 28 is a target or desired charge flow value, and the parameter error value PERR produced at the output of summing node 22 is a charge flow error value corresponding to a difference between the target and estimated charge flow values.

The closed-loop PI controller 20 may optionally include a feedforward input (FF) receiving a feedforward reference value from a reference block 34. In one embodiment, the feedforward reference value produced by block 34 is a table, graph or one or more equations relating to a desired actuator value, and may be included to minimize transient errors caused by disturbances produced by changes in the desired feedforward reference value.

The closed-loop PI controller 20 is operable to process the parameter error signal PERR supplied to the error input (ERR) of controller 20, and control one or more of the actuators $16_1$–$16_N$ via outputs $OUT_1$,-$OUT_N$. As illustrated in FIG. 1, the closed-loop PI controller 20 may be configured to control any one or more of the actuators $16_1$–$16_N$ directly, and actuators $16_1$–$16_N$ are shown electrically connected to outputs $OUT_1$–$OUT_N$ of controller 20 via signal paths $30_1$–$30_N$. The present invention further contemplates providing for an actuator process block 32 disposed between an output $OUT_K$ of PI controller 20 and any one of the actuators $16_K$ connected to process block 32 via signal path $30_K$. In this embodiment, the PI controller 20 is operable to produce a control signal or value at output $OUT_K$, and the actuator process 32 is operable to process this control signal or value and control actuator $16_K$ in accordance therewith. As an example of this embodiment, the actuator process 32 may correspond to an engine torque fueling process operable to supply a final fueling command to a fuel system actuator $16_K$ (i.e., a fuel injector solenoid). In this case, the output produced at output $OUT_K$ by PI controller 20 represents a torque derate value between 0 and 1 which acts as a multiplier on the maximum torque curve forming part of the fuel calculation process within actuator process 32. Lowering the maximum torque curve in this manner advantageously causes a lower rate of fueling, as desired, without external adjustment of the final fueling command produced by actuator process 32. Those skilled in the art will recognize other actuators and associated actuator processes for which the control arrangement just described would be desirable.

Figure 2:
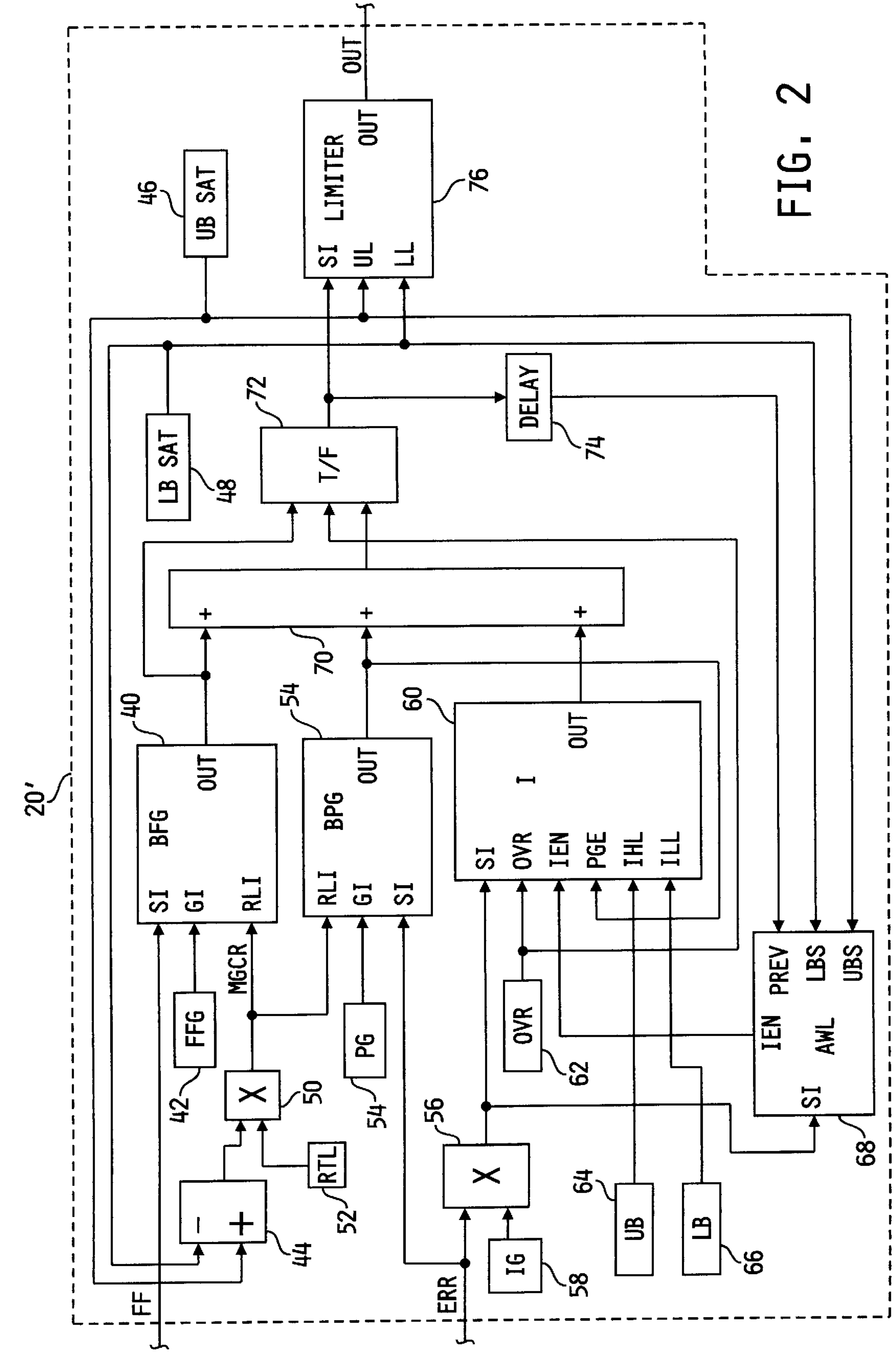
FIG. 2 is a diagrammatic illustration of one preferred embodiment of the closed-loop PI controller block of FIG. 1 for controlling a single actuator, in accordance with the present invention.

Referring now to FIG. 2, one preferred embodiment 20' of the closed-loop PI controller block of FIG. 1 for controlling a single actuator, in accordance with the present invention, is shown. Block 20' includes a bumpless forward gain block 40 having a signal input (SI) receiving the feedforward reference value from block 34 (FIG. 1) via the feedforward (FF) input of block 20'. A gain input (GI) of block 40 receives a feedforward gain value (FFG) from block 42, and a rate limit input (RLI) of block 40 receives a maximum gain change rate value (MGCR) from the output of a multiplier block 50. A first input of multiplier block 50 receives a rate limit value (RTL) from block 52, and a second input thereof receives a difference value from an arithmetic block 44. An addition input of arithmetic block 44 receives an upper-bound saturation value (UBSAT) from block 46, and a subtraction input of arithmetic block 44 receives a lower-bound saturation value (LBSAT) from block 48. Block 44 is operable to produce as an output thereof a difference between UBSAT and LBSAT.

PI controller block 20' further includes a bumpless proportional gain block 54 which is preferably identical to the bumpless forward gain block 40 and includes a rate limit input (RLI) connected to the output of multiplication block 50 and receiving the maximum gain change rate value (MGCR) thereat. Block 54 further includes a gain input (GI) receiving a proportional gain value (PG) from block 56, and a signal input (SI) receiving the parameter error value PERR via the error input (ERR) of block 20'.

The PI controller 20' further includes an integral block 60 having a signal input (SI) connected to the output of a multiplication block 56 having a first input receiving the parameter error value (PERR) via the error input (ERR) of block 20', and a second input receiving an integral gain value (IG) from block 58. An override input (OVR) of integral block 60 receives an override signal (OVR) from override block 62, and a proportional gain error input (PGE) of block 60 is connected to the output of the bumpless proportional gain block 54. An integration high limit input (IHL) receives an upper-bound value (UB) from block 64, and an integration lower limit input (ILL) receives a lower-bound value (LB) from block 66. An integration enable input (IEN) of integral block 60 is connected to an integration enable output (IEN) of an anti-windup logic block 68.

Outputs of the bumpless forward gain block 40, the bumpless proportional gain block 54 and the integral block 60 are each connected to addition inputs of a summation block 70 having a single output connected to one input of a true/false logic lock 72. A second input of the true/false logic block 72 is connected to the output of the bumpless forward gain block 40, and a third input of block 72 is connected to the override block 62. An output of the true/false logic block 72 is connected to a signal input (SI) of a limiter block 76 having an output OUT defining any one of the outputs $OUT_1$–$OUT_N$ of PI controller block 20 illustrated in FIG. 1. Limiter 76 includes an upper limit input (UL) receiving the upper-bound saturation value (UBSAT) provided by block 46, and a lower limit input (LL) receiving the lower-bound saturation value (LBSAT) from block 48.

The output of true/false logic block 72 is also supplied to an input of a delay block 74 defining a predefined delay period. In one embodiment, the delay period defined by delay block 74 corresponds to a one-frame delay (e.g., 10 microseconds), although the present invention contemplates providing for other delay values. In any case, the output of delay block 74 is connected to a previous input (PREV) of the anti-windup logic block 68. A lower-bound saturation input (LBS) of block 68 is connected to the lower-bound saturation block 48, and an upper-bound saturation input (UBS) of block 68 is connected to the upper-bound saturation block 46. A signal input (SI) of the anti-windup logic block 68 is connected to the output of multiplication block 56.

In the operation of the PI controller block 20' illustrated in FIG. 2, bumpless gain blocks 40 and 54 are operable to multiply their input signals by respective gain values FFG and PG, wherein the rates of change of FFG and/or PG are limited to provide for smooth gain scheduling in a manner to be more fully described hereinafter. The integral block 60 is operable to integrate the parameter error value (PERR) multiplied by the integral gain value (IG) between the lower and upper bound values (LB and UB respectively) as long as the override value (OVR) corresponds to a "false" value or non-override condition. Outputs of blocks 40, 54 and 60 are combined by block 70 and provided as an input to the true/false logic block 72. As long as the override value corresponds to a "false" value, or non-override condition, the true/false logic block 72 is operable to transfer the output of block 70 to the output of block 72. However, if the override value (OVR) corresponds to a "true" value, or override condition, the true/false logic block 72 is operable to transfer only the output of the bumpless forward gain block 40 to the output of block 72. Thus, under normal operating conditions, the engine control mechanism actuator controlled by the output of the limiter block 76 is controlled by the action of blocks 40, 54 and 60, and under abnormal, or "override" conditions, the actuator controlled by the output of limiter block 76 is controlled strictly by the output of the bumpless forward gain block 40. The anti-windup logic block 68 is included to provide for dynamic saturation of the integral block 60 as will be described in greater detail hereinafter.

It is to be understood that the bumpless forward gain block 40 illustrated in FIG. 2 is optional, and that controller 20' may accordingly omit blocks 40, 42 and 72 with the output of arithmetic block 70 connected directly to the signal input (SI) of limiter block 76. Although the override function described above is lost by omitting these blocks, the basic function of the PI controller in a normal operating mode is preserved. It should further be understood that one or more of the gain values FFG, PG and IG may be provided as static gain values or may alternatively be provided as dynamically changing gain values. It is in this latter case that operational advantages provided by the bumpless gain blocks 40 and 54 are become evident as will be described with respect to FIG. 3.

Figure 3:
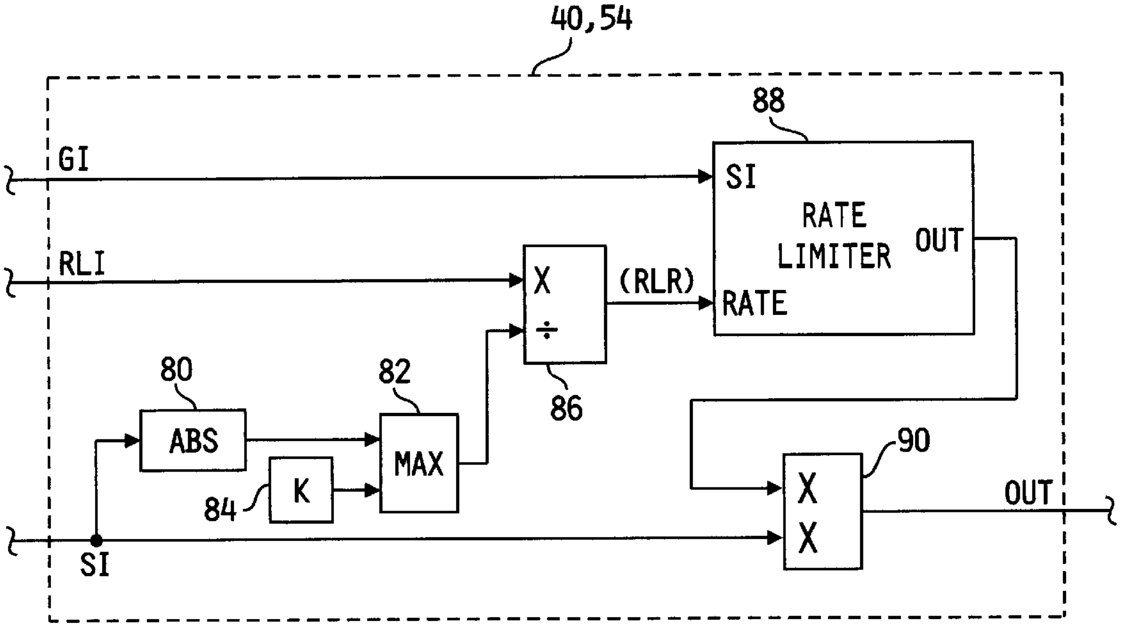
FIG. 3 is a diagrammatic illustration of one preferred embodiment of either of the bumpless gain blocks of FIG. 2, in accordance with the present invention.

Referring now to FIG. 3, one preferred embodiment of either of the bumpless forward gain block 40 or the bumpless proportional gain block 54, in accordance with the present invention, is shown. Block 40 or 54, as illustrated in FIG. 3, includes an absolute value block (ABS) 80 having an input connected to the signal input (SI) thereof and producing an output corresponding to the absolute value of the signal received at the signal input (SI). A max block 82 has a first input receiving the output of the absolute value block 80, and a second input receiving a constant value K from block 84. Preferably, K corresponds to a small, non-zero value, and max block 82 and constant block 84 are provided as divide-by-zero protection in the event that the signal produced by block 80 has a zero or near-zero value. The output of max block 82 is connected to a division input of an arithmetic block 86 having a multiplication input connected to the rate limit input (RLI) of block 40 or 54, and an output of block 86 is connected to a rate input (RATE) of a known rate limiter 88. A signal input (SI) of rate limiter 88 is connected to the gain input (GI) of blocks 40 or 54, and an output of the rate limiter block 88 is connected to a first input of a multiplication block 90 having a second input connected to the signal input (SI) of blocks 40 or 54. The output of multiplication block 90 produces the output of block 40 or 54.

Referring both to FIGS. 2 and 3, the PI controller 20' is operable to compute a maximum gain change rate value (MGCR) as a product of a rate limit value (RTL) and a difference between the upper-bound saturation value (UBSAT) and the lower-bound saturation value (LBSAT). This maximum gain change rate value (MGCR) is divided by an absolute value of the input signal (the feedforward reference term in the case of block 40 and the parameter error signal PERR in the case of block 54) by arithmetic block 86 to produce a rate limit ratio value (RLR) that is provided as the rate input to the rate limiter 88. The rate limiter 88 is operable to limit the rate of change of the gain value (FFG for block 40 and PG for block 54) to a rate defined by the rate limit ratio (RLR). The output of the rate limiter 88 is the rate-limited value of the gain input, and the output of multiplication block 90 thus produces a gain-compensated input signal wherein the gain value is rate limited to provide for smooth gain scheduling. The design of blocks 40 and 54 allows the maximum gain change rate (MGCR) to be specified such that when the required gain change rate is greater than the boundary established by UBSAT and LBSAT, the actual rate of change of the gain is limited by the rate limiter 88. This "bumpless" feature of blocks 40 and 54 thus ensures satisfactory signal tracking performance for sudden variations in the gain values (FFG for block 40 and PG for block 54).

Figure 4:
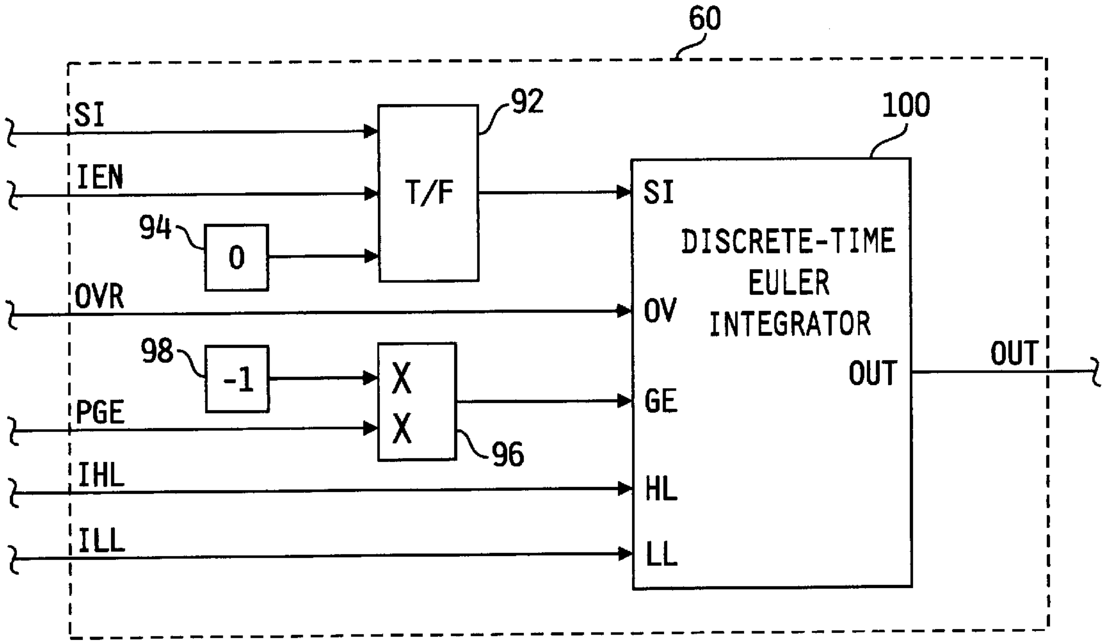
FIG. 4 is a diagrammatic illustration of one preferred embodiment of the integral block of FIG. 2, in accordance with the present invention.

Referring now to FIG. 4, one preferred embodiment of the integral block 60 of FIG. 3, in accordance with the present invention, is shown. Block 60 includes a true/false logic block 92 having a first input connected to the signal input (SI) of block 60, a second input connected to the integration enable input (IEN) of block 60, and a third input receiving a constant value from block 94 (e.g., 0). As long as the integration enable input (IEN) is "true," or active, the true/false logic block 92 is operable to transfer the signal at the signal input (SI) of block 60 to the signal input (SI) of a known discreet-time Euler integrator block 100. If, however, the integration enable input (IEN) corresponds to a "false" condition, the true/false block 92 is operable to transfer the 0 from block 94 to signal input (SI) of block 100. Block 92 is thus operable to enable or disable operation of the discreet-time Euler integrator block 100 based on the status of the integration enable input (IEN). The override input (OVR) of block 60 is connected to an override input (OV) of integrator block 100, the integration high limit input (IHL) of block 60 is connected to a high limit (HL) input of block 100, and the integration low limit input (ILL) of block 60 is connected to a low limit (LL) input of block 100. The proportional gain error input (PGE) of block 60 is connected to a first input of a multiplication block 96 having a second input receiving a constant value (e.g., −1) from block 98. An output of block 96 is supplied to a gain error (GE) input of the discreet-time Euler integrator block 100. The discreet-time Euler integrator block 100 is operable, as is known in the art, to integrate the input signal to block 60, as long as the integration enable input (IEN) is "true," as a function of the proportional gain error input (PGE) between the integration high limit defined by the IHL input and the integration low limit defined by the ILL input. The resulting output of the integrator block 100 is provided as the output of block 60, and can be overridden to any desired value (e.g., 0) based on the status of the override signal (OVR), as is known in the art.

Figure 5:
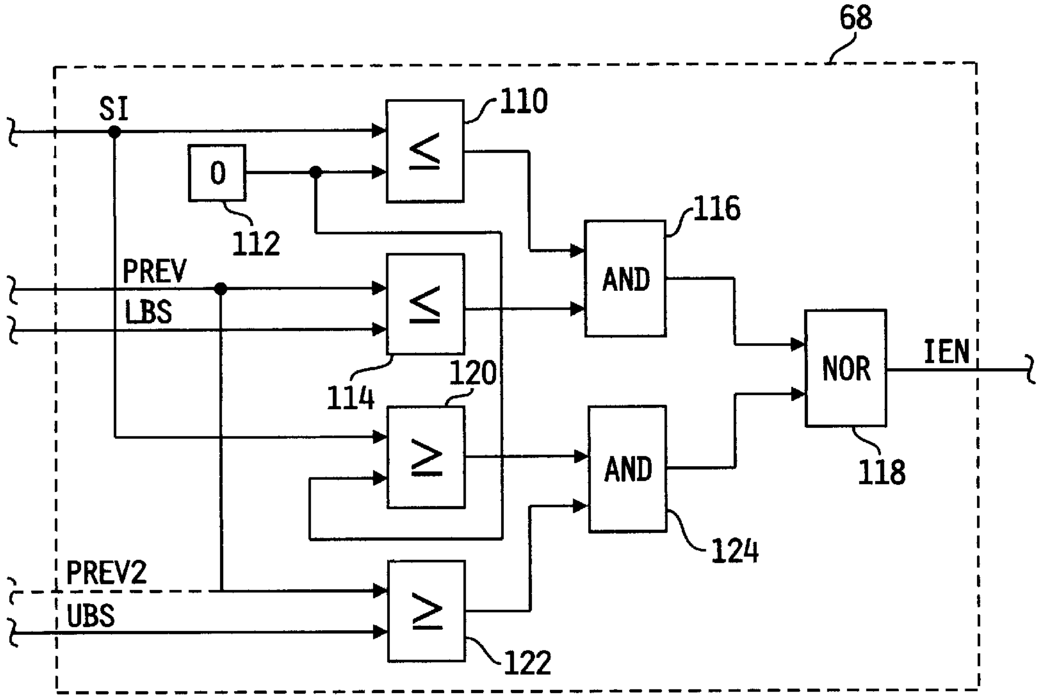
FIG. 5 is a diagrammatic illustration of one preferred embodiment of the anti-windup logic block of FIG. 2, in accordance with the present invention.

Referring now to FIG. 5, one preferred embodiment of the anti-windup logic block 68 of FIG. 3, in accordance with the present invention, is shown. Block 68 includes a logic block 110 having a first input connected to the signal input (SI) of block 68, and a second input receiving a constant value (e.g., 0) from block 112. Another logic block 114 has a first input connected to the previous input (PREV) of logic block 68, and a second input connected to the lower-bound saturation input (LBS) of block 68. The logic functions of both blocks 110 and 114 represent "less than or equal to" functions, and each block has an output connected to a respective input of a two-input AND block 116. Thus, if the signal input value is less than 0 and the previous value (PREV) is less than the lower-bound saturation value (LBS), the output of the AND block 116 is true, and is false for all other input conditions to blocks 110 and 114.

Block 68 further includes a third logic block 120 having a first input connected to the signal input (SI) of block 68 and a second input connected to the constant block 112. A fourth logic block 122 has a first input connected to the previous input (PREV), and a second input connected to the upper-bound saturation input (UBS) of block 68. The logic functions represented by blocks 120 and 122 each correspond to a "greater than or equal to" function, and outputs of blocks 120 and 122 are each supplied to corresponding inputs of a two-input AND block 124. Thus, if the signal input (SI) is greater than or equal to 0, and the previous input (PREV) is greater than or equal to the upper-bound saturation input (UBS), the output of the AND block 124 is true, and is false for all other input combinations to blocks 120 and 122.

The output of AND block 116 is connected to a first input of a NOR block 118 having a second input connected to the output of AND block 124. The output of NOR block 118 defines the integration enable signal provided to the integration enable input (IEN) of integral block 60. In the operation of block 68, the anti-windup logic illustrated in FIG. 5 monitors whether the output of the true/false logic block 72 of FIG. 3 is upper-bound or lower-bound saturated. If the output of block 72 (the PREV input of block 68) is saturated at the upper-bound defined by the UBSAT value produced by block 46, positive integration does not occur. In other words, if the signal input (SI) is greater than 0 and the previous (i.e., time-delayed) actuator control signal produced by block 72 is greater than the upper-bound saturation value (UBSAT) of block 46, the anti-windup logic block 68 is operable to disable the integrator block 100 of FIG. 4. Likewise, if the actuator control signal output of the true/false block 72 is saturated at the lower-bound defined by the lower-bound saturation value (LBSAT) of block 48, negative integration does not occur. In other words, if the signal input (SI) is less than 0, and the previous (i.e., time-delayed) actuator control signal produced at the output of true/false block 72 is less than the lower-bound saturation value (LBSAT), the anti-windup logic block 68 disables operation of the integrator block 100 of FIG. 4. All other combinations of the signal input (SI), previous (PREV), lower-bound saturation input (LBS) and upper-bound saturation input (UBS) cause the anti-windup logic block 68 to enable the integrator block 100 of FIG. 4. Operation of the anti-windup logic block 68, as just described, creates a dynamic saturation of the Pi integrator block 100 illustrated in FIG. 4.

Figure 6:
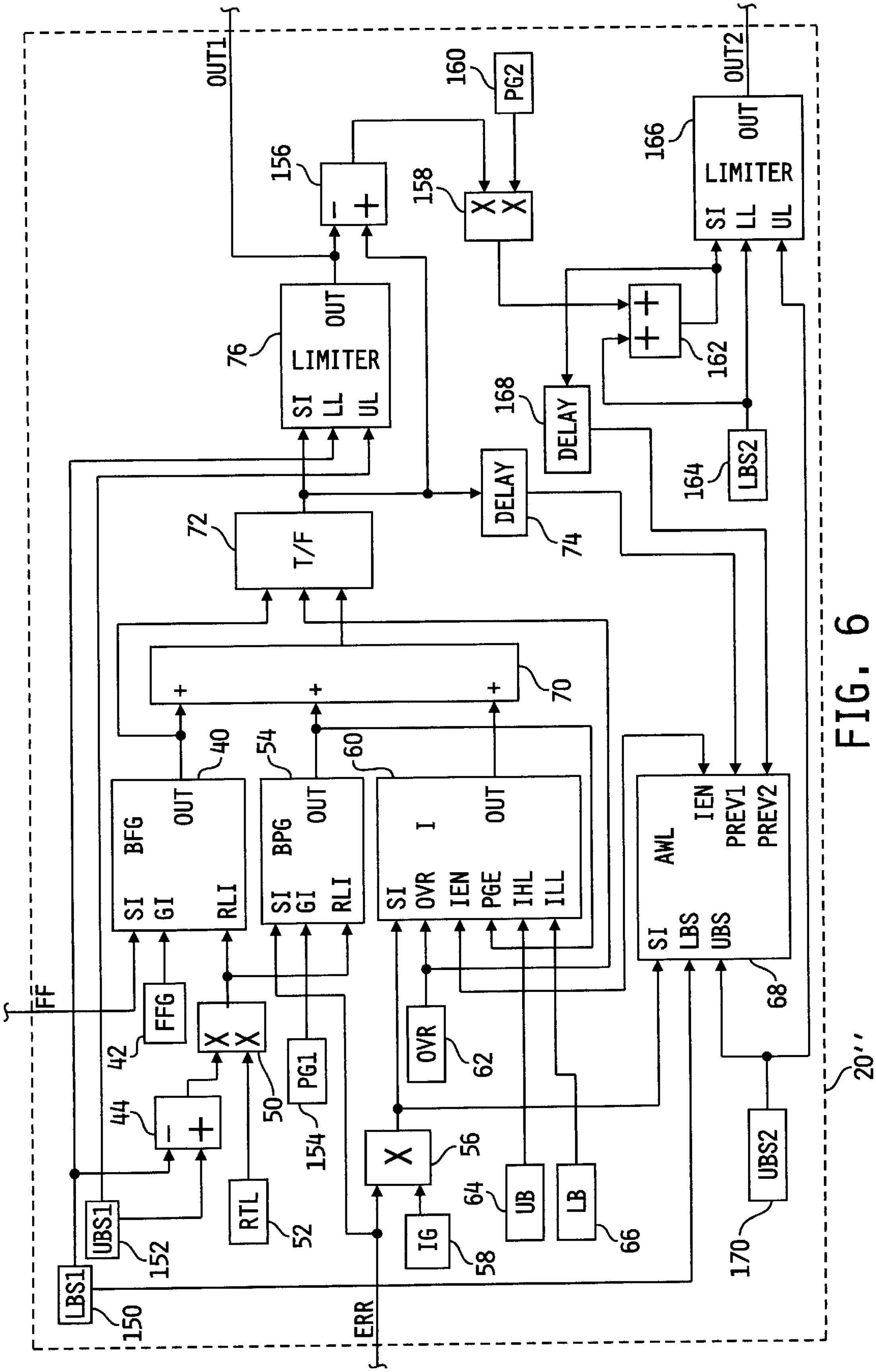
FIG. 6 is a diagrammatic illustration of one preferred embodiment of the closed-loop PI controller block of FIG. 1 configured to control multiple actuators, in accordance with the present invention.

Referring now to FIG. 6, one preferred embodiment 20" of the closed-loop PI controller block of FIG. 1 configured to control multiple engine control mechanism actuators, in accordance with the present invention, is shown. Embodiment 20" illustrated in FIG. 6 is identical in many respects to the single actuator controller embodiment 20' illustrated in FIG. 3, and like numbers are therefore used to identify like components. For example, the bumpless forward gain block 40, bumpless proportional gain block 54 and integral block 60 are identical to the corresponding blocks illustrated in FIG. 2, and preferred embodiments of which are illustrated in FIGS. 3–5. With regard to integral block 60, all inputs thereto described with respect to FIG. 2 are identical in FIG. 6, and the inputs to the bumpless forward gain block 40 and bumpless proportional gain block 54 differ as follows. First, since the PI controller block 20' of FIG. 6 is configured to control two actuators, each actuator has a different lower-bound saturation value and upper-bound saturation value associated therewith. Thus, the lower-bound saturation value supplied to the inverting input of arithmetic block 44 now corresponds to a first lower-bound saturation value (LBS1) produced by block 150, and the upper-bound saturation value supplied to the non-inverting input of arithmetic block 44 now corresponds to a first upper-bound saturation value (UBS1) produced by block 52. UBS1 and LBS1 correspond to the upper and lower signal values for limiter 76 which produces a first actuator drive signal output at output OUT1 of PI controller block 20". Also, since block 20" is configured to control two actuators, the proportional gain value supplied to the gain input (GI) of the bumpless proportional gain block 54 is now represented as proportional gain value PG1 produced by block 154 to distinguish this from a second proportional gain value PG2 produced by block 160. With regard to the anti-windup logic block 68, the embodiment shown in FIG. 6 includes an additional output as shown in phantom in FIG. 5. In the embodiment shown in FIG. 6, the output of delay block 74 is provided to a first previous input (PREV1) which corresponds to the (PREV) input of block 5. Unlike the configuration of block 68 described with respect to FIG. 2, however, the embodiment of logic block 68 for FIG. 6 includes a second previous input (PREV2) which is provided as the input to logic block 122 as shown in phantom in FIG. 5. In this embodiment, the connection between the input of logic block 122 and the first previous input (PREV) is omitted. Referring again to FIG. 6, the lower-bound saturation input (LBS) is connected to the first lower-bound saturation value (LBS1) produced by block 150, and the upper-bound saturation input (UBS) is connected to a second upper-bound saturation value (UBS2) produced by block 170. In this embodiment, the lower-bound saturation limit of the anti-windup logic block corresponds to the lower-bound saturation limit of the first actuator drive output signal produced by limiter 76, and the upper-bound saturation input in block 68 corresponds to the upper-bound saturation limit of the second actuator drive output signal produced by the output of a second limiter block 166 as will be described in greater detail hereinafter.

In addition to the circuit functions described with respect to FIG. 2, and the changes thereto just described with respect to FIG. 6, embodiment 20" of the PI controller block 20 of FIG. 1 further includes an arithmetic block 156 having a non-inverting input connected to the output of the true/false logic block 72 and receiving the first actuator control signal thereat, and an inverting input connected to the output of limiter block 76 and receiving the first actuator drive signal thereat. The output of block 156 produces a difference value between the first actuator control signal produced by block 72 and the first actuator drive signal produced by block 76. This signal is supplied to a first input of a multiplication block 158 having a second input receiving the second proportional gain value (PG2) produced by block 60. An output of block 158, corresponding to the product of the gain value PG2 and the difference value between the first actuator control signal produced by block 72 and the first actuator drive signal produced by block 76 is connected to a first input of a summing node 162 having a second input receiving a second lower-bound saturation value (LBS2) produced by block 164, wherein the lower-bound saturation value (LBS2) corresponds to the lower-bound saturation limit of the second actuator drive signal produced by limiter 166. An output of summation block 162 produces the second actuator control signal and is supplied to a signal input (SI) of a second limiter block 166 having a lower limit input (LL) receiving the lower-bound saturation limit (LBS2) from block 164 and an upper limit input (UL) receiving the upper-bound saturation limit (UBS2) from block 170. Limiter block 166 is operable, as is known in the art, to produce a second actuator drive signal corresponding to the second actuator control signal limited to an upper value of UBS2 and a lower value of LBS2. The output of block 162, corresponding to the second actuator control signal (i.e., the control signal for the second engine control mechanism), is provided to an input of another delay circuit 168 having a predefined delay value associated therewith. Preferably, the predefined delay period corresponds to a one-frame delay (e.g., 10 microseconds), although the present invention contemplates providing for other delay times. In any event, the output of delay block 168 is connected to the second previous input (PREV2) of the anti-windup logic block 68.

As with the embodiment 20' of the PI controller block 20 of FIG. 1 that was illustrated and described with respect to FIG. 2, the embodiment 20" of FIG. 6 may omit the optional bumpless forward gain block 40 and associated blocks 42 and 72, with the output of block 70 being connected directly to the signal input of limiter block 76. Also, as with the embodiment 20' described with respect to FIG. 2, one or more of the gain values FFG produced by block 42, PG1 produced by block 154, IG produced by block 58, and/or PG2 produced by block 160 may either be provided as static gains or as dynamically variable gains as described above.

The operation of the PI controller block 20" illustrated in FIG. 6 is identical to that described with respect to FIG. 2 for the actuator controlled by output OUT1. In other words, the parameter error signal (PERR) received at the error input (ERR) of block 20" is processed by blocks 40, 54 and 60 to produce a corresponding actuator control signal at the output of block 72 and a corresponding actuator drive signal at the output of limiter block 76. However, since the upper-bound saturation input to the anti-windup logic block 68 is now defined by the upper-bound saturation value (UBS2) associated with the second actuator, the anti-windup logic block 68 is not operable to disable the integrator block 100 of the integral block 60 when the actuator drive signal produced by limiter block 76 reaches the upper-bound saturation value (UBS1). Instead, the integrator block 100 of integral block 60 keeps integrating the parameter error signal and the difference between the actuator control signal produced at the output of block 72 and the now-limited actuator drive signal produced by the output of block 76 produce a positive difference value that is supplied by block 156 to the input of multiplication block 158. The output of block 158 is added to the lower-bound saturation value (LBS2) and applied to the signal input (SI) of the second limiter block 166. The limiter block 166 is operable to produce a second actuator drive signal at output OUT2 to thereby control a second actuator once the first actuator controlled by output OUT1 has reached its maximum actuation limit defined by the upper-bound saturation value UBS1. The integrator block 100 of integral block 60 keeps integrating the parameter error value (PERR) until the second actuator drive signal produced at the output of limiter 166 reaches the second upper-bound saturation value (UBS2), at which point the anti-windup logic block 68 disables the integrator 100 in a manner described hereinabove. The anti-windup logic block 68 thus precludes the interaction between the first and second actuators controlled by corresponding outputs OUT1 and OUT2 of block 20" when the first actuator drive signal produced by block 76 is approaching but not exceeding its upper-bound saturation limit (UBS1).

Figure 7A:
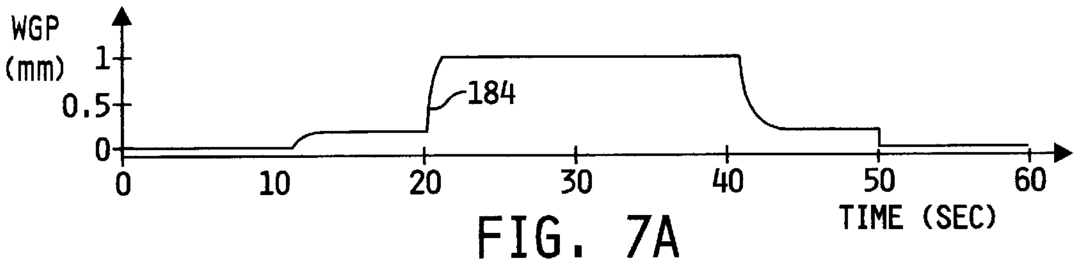
FIG. 7A is a plot of wastegate position vs. time illustrating example operation of the controller of FIG. 6 within the system of FIG. 1, in accordance with the present invention.
Figure 7B:
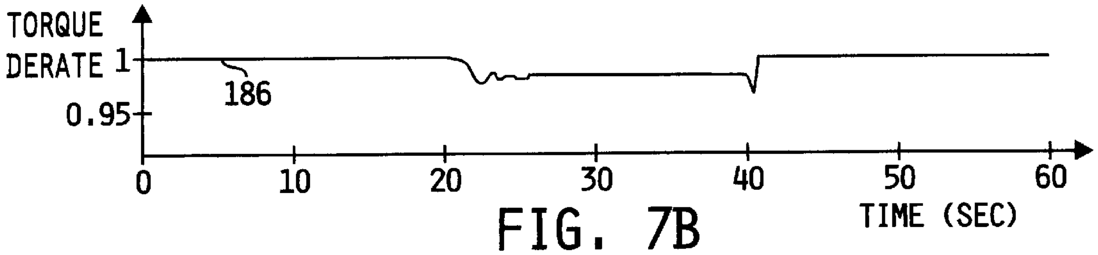
FIG. 7B is a plot of torque derate vs. time further illustrating the example of FIG. 7A.
Figure 7C:
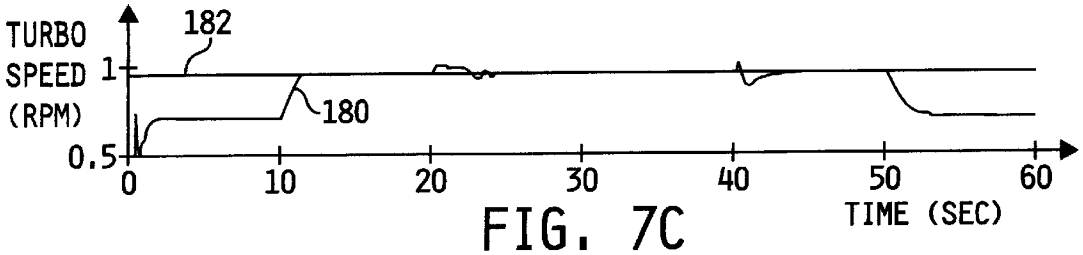
FIG. 7C is a plot of turbocharger speed vs. time further illustrating the example of FIGS. 7A and 7B.

Referring now to FIGS. 7A–7C, example operation of the double actuator PI controller 20" of FIG. 6 within the system of FIG. 1, in accordance with the present invention, is shown. In this example, the engine operating parameter sensor 14, of FIG. 1 corresponds to a turbocharger speed sensor producing a turbocharger speed signal on signal path $\mathbf{24}_1$. The parameter reference value stored in block 28 of FIG. 1 corresponds to a target turbocharger speed, and the parameter error value (PERR) in this example corresponds to a turbocharger speed error defined by a difference between the target turbocharger speed value stored in block 28 and the turbocharger speed signal produced by sensor $\mathbf{14}_1$, on signal path $\mathbf{24}_1$. Also in this example, actuator $\mathbf{16}_1$ corresponds to a turbocharger wastegate actuator connected to output OUT1 of the PI controller block 20" of FIG. 6 via signal path $\mathbf{30}_1$, and output OUT2 of PI controller 20" of FIG. 6 corresponds to output OUTK of FIG. 1, wherein the actuator process 32 illustrated in FIG. 1 corresponds to a torque fueling curve providing a final fueling command to actuator $\mathbf{16}_K$ which, in this case, corresponds to a fuel system actuator (i.e., a fuel injector solenoid). The output produced by limiter 166 at output OUT2 of PI controller 20" thus corresponds to a torque derate value between 0 and 1, wherein 0 corresponds to a maximum derate and a 1 corresponds to zero or no imposed derate. Referring again to FIGS. 7A–7C, the turbocharger speed waveform 180 of FIG. 7C is shown operating below the maximum desired turbocharger speed line 182 between 0 and 10 seconds. From 10 to 20 seconds, the turbocharger speed curve 180 of FIG. 7C has exceeded the turbocharger speed limit 182, but is constrained to this limit by action of the wastegate controlled by actuator drive signal produced at output OUT1 by limiter 76 as illustrated by the wastegate position curve 184 of FIG. 7A. During this time period, the torque derate value produced by limiter 166 was not active since the wastegate actuator output of limiter 76 was able to constrain the turbocharger speed to the turbocharger speed limit 182. However, between 20 and 40 seconds, the turbocharger speed 180 has increased further and the wastegate actuator drive signal produced by limiter block 76 has reached its upper-bound saturation value ($UBS_1$). Even though the wastegate is fully open at this point, the turbocharger speed 180 cannot be constrained to the turbocharger speed limit 182. In this time frame, the output of the second limiter 166 is below its upper-bound saturation value (UBS2) so the anti-windup logic block 68 maintains the integrator block 100 of integral block 60 in an operational state. This causes arithmetic block 156 to generate a positive output signal since the actuator control signal produced at the output of block 72 is now greater than the upper-limit saturated actuator drive signal output produced by block 76. A positive value produced by block 156 activates limiter block 166 so that a torque derate value is imposed between approximately 22 and 40 seconds in the timeline of FIGS. 7A–7C to maintain the turbocharger speed 180 below the turbocharger speed limit 182 with little overshoot as illustrated in FIG. 7C. From 40 to 50 seconds, the turbocharger speed has slowed sufficiently so that a torque derate 186 is no longer necessary, and the turbocharger speed 180 can be constrained to the turbocharger speed limit 182 by action of the wastegate actuator drive signal 184 produced at the output of limiter 76. From 50 to 60 seconds, the turbocharger speed 180 is below the turbocharger speed limit 182, so that neither of the limiter circuits 76 and 166 produce an output signal to control either the wastegate actuator or the torque derate value.

While the invention has been illustrated and described in detail in the foregoing drawings and description, the same is to be considered as illustrative and not restrictive in character, it being understood that only one preferred embodiment thereof has been shown and described and that all changes and modifications that come within the spirit of the invention are desired to be protected.

What is claimed is:

1. A closed-loop actuator control circuit, comprising:

a first arithmetic circuit producing an error signal as a difference between an engine operating parameter signal and a reference parameter value;

a controller responsive to said error signal to produce an actuator control signal;

a first limiter responsive to said actuator control signal to produce a first actuator drive signal for driving a first actuator associated with a first engine control mechanism to minimize said error signal; and a second limiter responsive to a difference between said first actuator control signal and said first actuator drive signal to produce a second actuator drive signal, said second actuator drive signal driving a second actuator associated with a second engine control mechanism separate from said first engine control mechanism to minimize said error signal when said first actuator drive signal is limited by said first limiter to a maximum first actuator drive signal limit.

2. The control circuit of claim 1 further including an engine operating parameter sensor responsive to an engine operating condition to produce said engine operating parameter signal.

3. The control circuit of claim 1 further including a number of engine operating parameter sensors producing a corresponding number of engine operating signals each associated with a different engine operating condition;

wherein said engine operating parameter signal is a composite signal based on at least some of said number of engine operating signals.

4. The control circuit of claim 1 further including:

a number of engine operating parameter sensors producing a corresponding number of engine operating signals each associated with a different engine operating condition; and means for estimating said engine operating parameter signal as a function of at least one of said number of engine operating signals.

5. The control circuit of claim 1 wherein said controller includes:

a first proportional gain circuit responsive to said error signal and a first proportional gain value to produce a first proportional signal; and an integral circuit responsive to said error signal and an integral gain value to produce an integral signal;

and wherein said actuator control signal is a function of said first proportional signal and said integral signal.

6. The control circuit of claim 5 further including means for producing a feedforward value;

wherein said controller further includes a second proportional gain circuit responsive to said feedforward value and a second proportional gain value to produce a second proportional signal;

and wherein said actuator control signal is further a function of said second proportional signal.

7. The control circuit of claim 5 further including a second arithmetic circuit producing a second actuator control signal as a product of said difference between said first actuator control signal and said first actuator drive signal and a second actuator gain value, said second limiter responsive to said second actuator control signal to produce said second actuator drive signal.

8. The control circuit of claim 7 further including a third arithmetic circuit producing said second actuator control signal a sum of said product and a minimum second actuator drive signal limit associated with said second limiter.

9. The control circuit of claim 7 further including an anti-windup circuit having a first input receiving said first actuator control signal delayed in time, a second input receiving a minimum first actuator drive signal limit associated with said first limiter and a third input receiving said error signal, said anti-windup circuit disabling integration of said error signal by said integral circuit if said first actuator control signal delayed in time is less than said minimum first actuator drive signal limit and said error signal is less than a predefined error value.

10. The control circuit of claim 9 wherein said anti-windup circuit includes a fourth input receiving said second actuator control signal delayed in time and a fifth input receiving a maximum second actuator drive signal limit associated with said second limiter, said anti-windup circuit disabling integration of said error signal by said integral circuit if said second actuator control signal delayed in time is greater than said maximum second actuator drive signal limit and said error signal is greater than said predefined error value.

11. The control circuit of claim 5 wherein said first proportional gain circuit includes:

a second arithmetic circuit producing a maximum gain rate change as a function of said maximum first actuator drive signal limit, a minimum first actuator drive signal limit associated with said first limiter and a rate limit value;

a rate limiter responsive to said maximum gain rate change to limit said first proportional gain value to a rate-limited gain value; and a third arithmetic circuit producing said first proportional signal as a product of said rate limited gain value and said error signal.

12. The control circuit of claim 11 wherein said first proportional gain circuit further includes a fourth arithmetic circuit producing a rate limit ratio as a ratio of said maximum gain rate change and an absolute value of said error signal, said rate limiter limiting said rate of change of said first proportional gain value by limiting said first proportional gain value to said rate limited gain value as a function of said rate limit ratio.

13. A closed-loop actuator control circuit, comprising:

a rate limiter limiting a proportional gain value to a rate-limited gain value based on a maximum gain change rate value;

a first arithmetic circuit producing a proportional signal as a product of an engine operating parameter error signal and said rate-limited gain value;

a controller circuit producing an actuator control signal based at least in part on said proportional signal; and a limiter circuit limiting said actuator control signal to between upper and lower limit values and producing an actuator drive signal corresponding thereto for driving an actuator associated with an engine control mechanism to minimize said error signal.

14. The control circuit of claim 13 further including a second arithmetic circuit responsive to said upper and lower limit values and a rate limit value to produce said maximum gain rate change value.

15. The control circuit of claim 14 further including a third arithmetic circuit producing a rate limit ratio as a ratio of said maximum gain rate change value and an absolute value of said error signal, said rate limiter limiting a rate of change of said proportional gain value by limiting said proportional gain value to said rate limited gain value as a function of said rate limit ratio.

16. The control circuit of claim 13 wherein said controller further includes an integral circuit producing an integral signal by integrating said error signal, said controller circuit producing said actuator control signal based on said proportional signal and said integral signal.

17. The control signal of claim 13 further including a second arithmetic circuit producing said engine operating parameter error signal as a difference between an engine operating parameter signal and a reference parameter value.

18. The control circuit of claim 17 further including an engine operating parameter sensor responsive to an engine operating condition to produce said engine operating parameter signal.

19. The control circuit of claim 17 further including a number of engine operating parameter sensors producing a corresponding number of engine operating signals each associated with a different engine operating condition;

wherein said engine operating parameter signal is a composite signal based on at least some of said number of engine operating signals.

20. The control circuit of claim 17 further including:

a number of engine operating parameter sensors producing a corresponding number of engine operating signals each associated with a different engine operating condition; and means for estimating said engine operating parameter signal as a function of at least one of said number of engine operating signals.

21. A closed-loop actuator control circuit, comprising:

an integral circuit integrating an engine operating parameter error signal to produce an integral signal;

a first arithmetic circuit producing an actuator control signal based at least in part on said integral signal;

a limiter circuit limiting said actuator control signal to between upper and lower limit values and producing an actuator drive signal corresponding thereto for driving an actuator associated with an engine control mechanism to minimize said error signal; and an anti-windup circuit having a first input receiving said upper limit value, a second input receiving said actuator control signal delayed in time and a third input receiving said error signal, said anti-windup circuit disabling integration of said error signal by said integral circuit if said actuator control signal delayed in time is greater than said upper limit value and said error signal is greater than a predefined error value.

22. The control circuit of claim 21 wherein said anti-windup circuit further includes a fourth input receiving said lower limit value, said anti-windup circuit further disabling integration of said error signal by say integral circuit if said actuator control signal delayed in time is less than said lower limit value and said error signal is less than said predefined value.

23. The control circuit of claim 22 further including a proportional gain circuit responsive to said error signal and a proportional gain value to produce a proportional signal, said first arithmetic circuit producing said actuator control signal based on said integral signal and said proportional signal.

24. The control signal of claim 22 further including a second arithmetic circuit producing said engine operating parameter error signal as a difference between an engine operating parameter signal and a reference parameter value.

25. The control circuit of claim 24 further including an engine operating parameter sensor responsive to an engine operating condition to produce said engine operating parameter signal.

26. The control circuit of claim 24 further including a number of engine operating parameter sensors producing a corresponding number of engine operating signals each associated with a different engine operating condition;

wherein said engine operating parameter signal is a composite signal based on at least some of said number of engine operating signals.

27. The control circuit of claim 24 further including:

a number of engine operating parameter sensors producing a corresponding number of engine operating signals each associated with a different engine operating condition; and means for estimating said engine operating parameter signal as a function of at least one of said number of engine operating signals.

* * * * *